US005520053A

United States Patent [19]

Weber et al.

[11] Patent Number: 5,520,053

[45] Date of Patent: May 28, 1996

[54] ULTRASOUND TESTING DEVICE FOR GAS PRESSURE ACCUMULATORS

[75] Inventors: Norbert Weber, Sulzbach/Saar; Karl-Heinz Leichner, Friedrichsthal, both of Germany

[73] Assignee: Hydac Technology GmbH, Sulzbach/Saar, Germany

[21] Appl. No.: 374,720

[22] PCT Filed: Jul. 23, 1993

[86] PCT No.: PCT/EP93/01964

§ 371 Date: Jan. 27, 1995

§ 102(e) Date: Jan. 27, 1995

[87] PCT Pub. No.: WO94/04898

PCT Pub. Date: Mar. 3, 1994

[30] Foreign Application Priority Data

Aug. 21, 1992 [DE] Germany .......................... 42 27 657.8

[51] Int. Cl.[6] ........................................ G01L 11/00

[52] U.S. Cl. ................................ 73/628; 73/703; 138/31

[58] Field of Search ............................ 73/627, 628, 703, 73/745, 40.5 A; 138/31, 30; 367/93

[56] References Cited

U.S. PATENT DOCUMENTS

| | | | |
|---|---|---|---|
| 4,143,553 | 3/1979 | Martens et al. | 73/625 |
| 4,407,330 | 10/1983 | Fujiwara | 138/30 |
| 4,577,663 | 3/1986 | Andersen et al. | 138/31 |
| 4,644,976 | 2/1987 | Peter et al. | 138/31 |
| 4,920,802 | 5/1990 | McMullin et al. | 73/597 |
| 5,024,250 | 6/1991 | Nakamura | 138/31 |
| 5,445,034 | 8/1995 | Peter et al. | 73/861.75 |

FOREIGN PATENT DOCUMENTS

| | | |
|---|---|---|
| 4116482 | 11/1992 | Germany . |
| 2128741 | 5/1984 | United Kingdom . |

OTHER PUBLICATIONS

Patent Abstracts of Japan, vol. 11, No. 293 (P–619), abstract of JP,A, 62–88911, 23 Apr. 1987.

Patent Abstracts of Japan, vol. 10, No. 76 (P–440), abstract of JP,A, 60–214226, 26 Oct. 1985.

Patent Abstracts of Japan, vol. 10, No. 143 (P–459), abstract of JP,A, 60–262019, 25 Dec. 1985.

Patent Abstracts of Japan, vol. 10, No. 149 (P–461), abstract of JP,A, 61–3012, 9 Jan. 1986.

*Primary Examiner*—John E. Chapman

*Attorney, Agent, or Firm*—Roylance, Abrams, Berdo & Goodman

[57] ABSTRACT

An ultrasound testing device for gas pressure accumulators is used to test a predeterminable set position that can be taken by a movable separating element inside an accumulator filled with gas and connected to a fluid circuit. The separating element has at least one testing body associated with a visible mark which indicates the set position of the separating element. An ultrasound testing device on a testing body can be set on the accumulator in alignment with the visible mark. This testing device allows a plurality of accumulators of the same type to be tested for their predeterminable gas pressure set value, which corresponds to the gas pre-filling pressure, by a single hand apparatus. This kind of test is economical and achieves reliable results.

8 Claims, 1 Drawing Sheet

ULTRASOUND TESTING DEVICE FOR GAS PRESSURE ACCUMULATORS

FIELD OF THE INVENTION

The present invention relates to a device to monitor or control a predetermined set position, which can be sensed, of a movable separating element within an accumulator. The accumulator can be filled with gas and can be connected to a fluid circuit. The separating element position in the accumulator can be sensed by an ultrasound testing device mountable on the accumulator.

BACKGROUND OF THE INVENTION

Such accumulators can be called gas pressure accumulators, piston accumulators, diaphragm accumulators and bubble accumulators. Each accumulator has a predetermined pressure set value on the gas side before connection thereof to the fluid circuit. This value can be indicated as the initial gas pressure of the accumulator. In such accumulators, it is necessary at certain time intervals to monitor and control the initial gas pressure required for precise and safe operation. Some gas leakage is to be dealt with dependent upon the manner of operation of the accumulator. Furthermore, in safety devices, the gas level or gas pressure may not drop below a minimum level in an accumulator to guarantee that the system continues to operate.

German Patent No. 40 06 905 A1 (corresponding to U.S. patent application Ser. No. 07/664,285, entitled Method and Apparatus For Maintaining A Predetermined Theoretical Pressure Level and filed in the name of Karl-Eberhard Baldauf on Mar. 5, 1991, now abandoned, the subject matter of which is hereby incorporated by reference) discloses maintaining a predeterminable pressure set value in the accumulator by a measuring process in which at least at certain time intervals a connection for charging the gas is produced between the accumulator and a measuring chamber, having only a portion of the accumulator volume, while the measuring chamber is accessible through a suitable pressure measuring device. To maintain the predeterminable set pressure level when a pressure drop occurs, the connection is produced between the accumulator and a filling device through the measuring chamber. The measuring chamber then serves as a dosing chamber until the actual pressure level in the accumulator is again identical to the set value. High-cost and highly technical equipment is required for this known process for establishing gas pressure. Completely automatic operation is possible only with a control means of complicated construction. Thus, this known monitoring device is costly in construction and operation.

To limit the technical equipment outlay, a bubble accumulator is disclosed in the subsequently published German Patent No. 41 16 482 (corresponding to U.S. patent application Ser. No. 08/119,147, entitled Method of Measuring The Pressure Of A Gas In A Gas Accumulator And Device For Carrying Out The Method, and filed on Sep. 22, 1993 in the names of Gunther Peter and Norbert Weber, now U.S. Pat. No. 5,445,034, the subject matter of which is hereby incorporated by reference), to measure the gas pressure set value associated with the separating element (bubble accumulator) in a predeterminable position by means of a pressure pickup on the fluid side. The control of the position of the separating element occurs through the contact/closing position of the poppet valve of the accumulator. The contact position is controllable by means of a control device. However, considerable technical outlay is required for each individual accumulator to be controlled. Furthermore, the measuring device required for processing of the position data of the poppet valve and to pick up the values from the pressure level pick-up on the fluid side is technically costly. Thus, this monitoring device is costly in production and operation.

German Patent No. 26 49 049 A1 discloses a device for monitoring the position of a separating element movable within an accumulator in the form of a hydraulic cylinder. An ultrasound testing device is present in and arranged stationary on or near the bottom of the hydraulic cylinder. This known device detects movements and breakdown of the operation in underground mining operations, where the hydraulic cylinder being used must work safely and reliably for a long time under difficult working conditions. The measured path of movement of the separating element can also be detected from a remote station, so that central monitoring and control of an approximate point is possible. This device is costly and cost-intensive, since the controlled hydraulic cylinder is permanently provided with the ultrasound testing device to obtain monitoring or control. Additionally, the measuring and evaluating unit associated with the ultrasound testing device is correspondingly expensive, since the dynamic movements of the piston of the hydraulic cylinder are picked up by the monitoring system.

German Patent No. 37 32 219 A1 discloses a method in which electric-magnetic ultrasound conversion is used for control of filling level and bubble formation in enclosures (accumulators). The ultrasound testing device is mounted on the outside of the accumulator, and provides a coupling of the ultrasound test heads without liquid/fluid coupling medium and without special coupling foils. This known filling condition and bubble detection serves for monitoring/control of liquids in nuclear reactor pressure containers, especially those in the form of so-called boiling water reactors.

SUMMARY OF THE INVENTION

Objects of the invention involve providing a device for monitoring or controlling a gas pressure set value in an accumulator, which is low-cost in production and operation and which can monitor a plurality of accumulators without modification of accumulator construction.

The foregoing objects are basically obtained by a device for monitoring a predetermined set position of a separating element which is movably mounted in an accumulator. The accumulator is filled with gas and coupled to a fluid circuit. The device comprises a plurality of testing bodies having mounting means for attaching the testing bodies on the separating element at a predetermined spacing from one another, visible marking means for mounting on an outside periphery of the accumulator and defining the predetermined set position of the separating element, and a manual element having ultrasound testing means alignable with the markings. The manual apparatus is accessible to each of the testing bodies through a testing head.

The manual apparatus, with the ultra-sound testing means, can be brought into position in alignment with the markings such that every testing body has a testing head at its disposal. A single testing device can monitor a plurality of accumulators of a certain order of magnitude for gas and pressure leaks. The technical equipment outlay thereby is limited.

Furthermore, the accumulators to be monitored need not be altered or modified, providing an operationally safe and low-cost operation of the accumulator, as well as the site provided with it. Ultrasound testing devices have been the state of the art for many years. Many users of gas pressure accumulators in other technical areas, such as material testing, are familiar with their use, so that technical problems in the introduction of the monitoring devices according to the present invention are not expected from the users.

By using a plurality of testing bodies, the position of the separating element, and therewith, the presence of the predeterminable gas pressure set value in the accumulator can be established. With three or more testing bodies a redundant system is obtained. The breakdown of one testing body or testing head does not cause breakdown of the entire monitoring device as a result. The configuration of a part of the ultrasound testing device as a manual apparatus allows for user-friendly mobile use.

For the markings on the outside periphery of the accumulator, the spacing of the markings is preferably selected to be identical or equal to the height/level of the separating element. The manual element outside contour can be brought into alignment with these markings. In this manner, a secure positioning of the manual device within the predeterminable markings, which are ascertained by the set position of the separating element, is guaranteed, so that errors in measurement are certain to be avoided. The marking can also be at some slightly divergent spacing therefrom, so that a sort of tolerance field/range is formed. Within that range, the piston can assume its set position in such a manner that the operability of the gas pressure accumulator according to the automatically set values is still assured.

In one preferred embodiment of the device according to the present invention, the relevant testing body is formed of a control strip and/or of sealing gasket of the separating element. In this manner, control strips and sealing gaskets, which are already traditionally provided on a separating element, can be used as testing bodies. Constructive modifications of the separating element are a waste of time and effort with application of additional testing bodies.

In another preferred embodiment of the device according to the present invention, the manual device has an interface for connecting the manual device to a measuring device of the ultrasound testing apparatus. For this, the measuring device of the ultrasound testing apparatus can be arranged stationary within a hydraulic assembly. The accumulator and the manual device need only be connected through its interface to an interface of the measuring device associated with the accumulator. In one preferred embodiment, the measuring device is located in the manual device and the operator receives an optical or acoustic signal as soon as the pairs of testing bodies and testing sensors associated with one another lie adjacent to one another.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
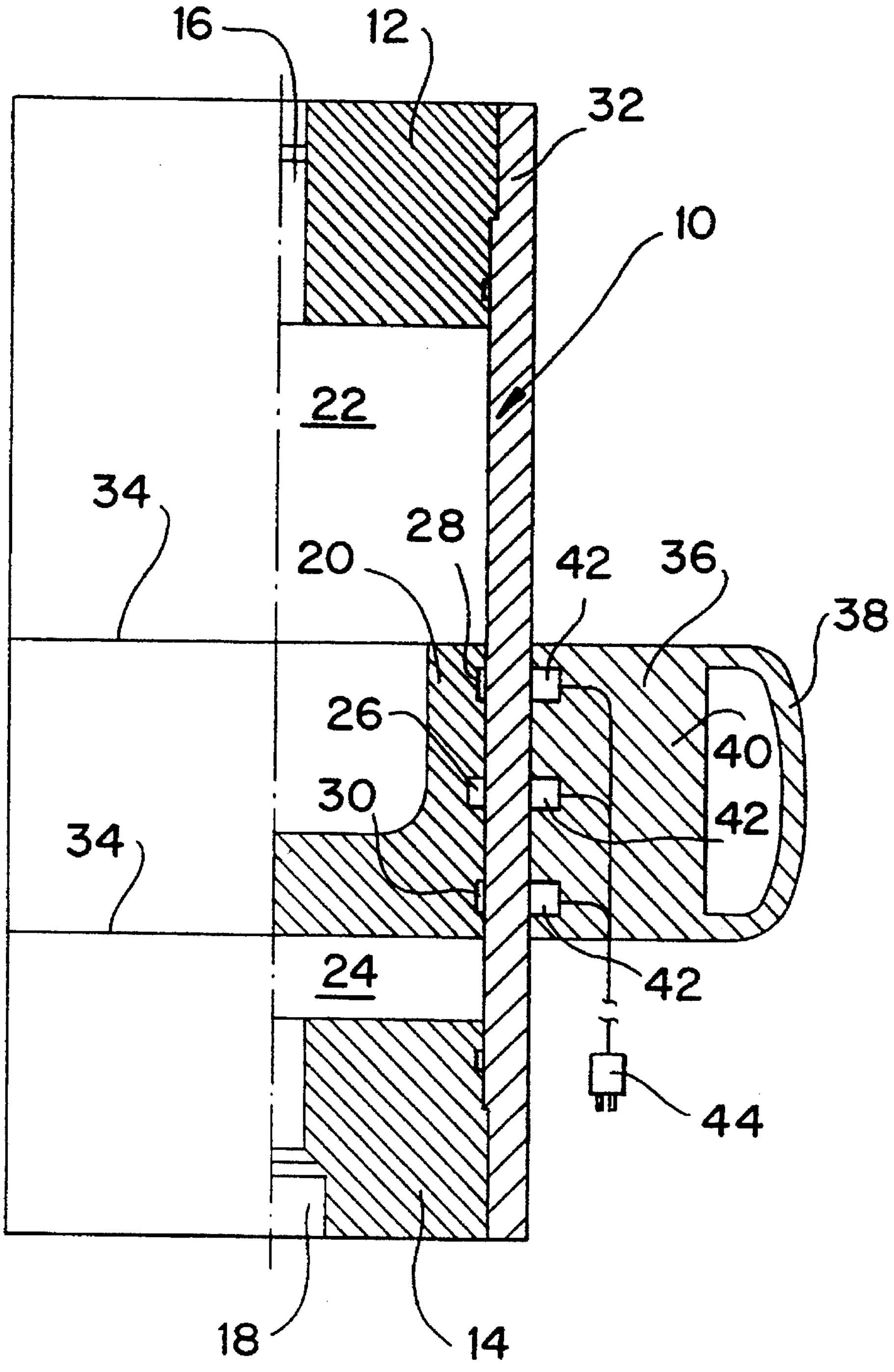
FIG. 1 is a side elevational view, partially in section, of a gas accumulator with a manual apparatus mounted thereon according to the present invention.

A piston 10 is used as an accumulator. Such piston accumulators are conventional, and thus, need not be described in detail. The piston accumulator cooperates with an ultrasound testing device according to the present invention.

Piston accumulator 10 comprises breechblock mechanisms or closures 12 and 14 on both ends. The closures have connector boreholes 16 and 18 passing through them. Connector boreholes 16 and 18 connect the accumulator to a nitrogen source or to a fluid circuit (both not shown).

Within piston accumulator 10, a piston 20 is longitudinally slidably arranged. Piston 20 forms the separating element of accumulator 10 and separates a gas chamber 22 from a fluid or liquid chamber 24 in a sealed manner. Piston 20 has a sealing gasket 26 around its periphery, and control strips 28 and 30 adjacent its ends. The control strips 28 and 30 can be of plastic materials and can protect against friction and wear during movement of piston 20 along the cylindrical peripheral housing 32 of accumulator 10.

Before its first use in a hydraulic system, the gas-pressure or hydraulic-accumulator is filled with a predeterminable gas volume in gas chamber 22, so that a gas pressure set value is present in gas chamber 22. According to the predetermined gas pre-filling pressure, the separating element (piston 20) assumes a set position, for instance, the position shown in the drawing. The set position of piston 20 can be determined beforehand and indicated by two markings 34 on the outside periphery of housing 32. In the illustrated embodiment, the spacing of the two markings 34 from one another corresponds to the direction of movement of piston 20 viewed along its piston length or piston height. To determine the set position of piston 20 for the gas pressure set level, an ultrasound testing device according to the present invention is used.

The ultrasound testing device is accessible through a manual apparatus 36 having a strap-like handle 38. Handle 38 is engaged on a plate-like front part 40 of manual apparatus 36. In the front of part 40, three testing heads 42 are embedded, open to the outside, and fit in tightly with the front of the front part 40. Testing heads 42 are conventional, commercially available ultrasound sensors. Each testing head 42 can transmit and receive ultrasound waves.

As shown in FIG. 1, manual apparatus 36 is mounted in alignment with and between the two markings 34 on the outside periphery of piston accumulator 10. If piston 20 is in its set position, shown in the drawing, each testing head 42 is arranged facing a testing body, formed by control strip 28 or 30 or sealing gasket 26. The sound waves radiated from testing heads 42 are reflected in the area of sealing gasket 26, as well as control strips 28 and 30, differently from transmission through the steel of housing 32 and piston 20. By linking of the reflected signals in testing heads 42, then, only with simultaneous multiple echos is an optical or acoustic signal indicated to the operator, so that the piston position and the gas pressure can be determined unambiguously.

If piston 20 does not then assume its set position shown in the drawing, then this other position is determined through the ultrasound testing device. The gas disappearing is replaced/compensated through connector borehole 16 until the piston reaches its set position again. In this manner, safety devices assure that the gas pressure accumulator will not go below a minimum pressure, which could negatively influence or even totally abolish its operability.

The monitoring/control device according to the present invention can also operate without further problems, with two pairs of testing heads and testing bodies. It would also be conceivable to read one single testing body by means of only one testing head, which in turn would be associated with one marking. This testing body would have to transmit a characteristic measuring image in the case of ultrasound testing, and the ultrasound testing device would likewise have to calibrate this special type of a signal. The ultrasound behavior of this testing body at any rate may not be comparable to the behavior of sealing gaskets or operating strips, which generally are required for the operation of the piston.

The manual apparatus has an interface 44 for connection to the actual measuring device (not shown) of the ultrasound testing apparatus. That apparatus will process the reflected ultrasound signals which have been detected. Such testing apparatus or testing devices are known from material testing and belong to the state of the art. With suitable modification, the testing device according to the present invention can also be used with weight, spring and diaphragm accumulators.

While various embodiments have been chosen to illustrate the invention, it will be understood by those skilled in the art that various changes and modifications can be made therein without departing from the scope of the invention as defined in the appended claims.

What is claimed is:

1. A device for monitoring a predetermined set position of a separating element which is movably mounted in an accumulator, the accumulator being filled with gas and coupled to a fluid circuit, the device comprising:

a plurality of testing bodies having mounting means for attaching said testing bodies on the separating element at a predetermined spacing from one another;

visible marking means for mounting on an outside periphery of the accumulator and defining the predetermined set position of the separating element; and a manually positionable apparatus alignable with said markings, said manually positionable apparatus having ultrasound testing means for sensing each of said testing bodies through a testing head.

2. A device according to claim 1 wherein said testing bodies comprise control strips on the separating element.

3. A device according to claim 1 wherein one of said testing bodies is a sealing gasket on the separating element.

4. A device according to claim 1 wherein said manually positionable apparatus comprises interface means for coupling said ultrasound testing means to an ultrasound testing apparatus.

5. An accumulator, comprising:

a housing having gas and fluid chambers, and an outer periphery;

a separating element movably mounted in said housing and separating said gas and fluid chambers;

a plurality of testing bodies mounted on said separating element at a predetermined spacing from one another;

visible marking means on said outer periphery of said housing defining a predetermined set position of said separating element; and a manually positionable apparatus alignable with said markings, said manually positionable apparatus having ultrasound testing means for sensing each of said testing bodies through a testing head.

6. An accumulator according to claim 5 wherein said testing bodies comprise control strips on the separating element.

7. An accumulator according to claim 5 wherein one of said testing bodies is a sealing gasket on the separating element.

8. An accumulator according to claim 5 wherein said manually positionable apparatus comprises interface means for coupling said ultrasound testing means to an ultrasound testing apparatus.

* * * * *